United States Patent [19]

Yamamoto et al.

[11] Patent Number: 5,454,271
[45] Date of Patent: Oct. 3, 1995

[54] METHOD AND APPARATUS FOR MEASURING POWDER FLOW RATE

[75] Inventors: Masahiro Yamamoto; Yutaka Ishikawa; Kenzo Yanagida, all of Tokyo, Japan

[73] Assignee: Onoda Cement Co., Ltd., Onoda, Japan

[21] Appl. No.: 277,212

[22] Filed: Jul. 19, 1994

[30] Foreign Application Priority Data

Jul. 23, 1993 [JP] Japan .................. 5-182733

[51] Int. Cl.$^6$ .................. B65G 51/02
[52] U.S. Cl. .................. 73/861.04; 73/32 R; 73/861.07; 73/861
[58] Field of Search .................. 73/32 R, 861.04, 73/861.07, 861

[56] References Cited

U.S. PATENT DOCUMENTS

| | | | |
|---|---|---|---|
| 3,988,926 | 11/1976 | Haas | 73/861.07 |
| 4,480,947 | 11/1984 | Nagasaka | 73/861.04 |
| 4,941,778 | 7/1990 | Lehmann | 73/861.04 |
| 5,351,520 | 10/1994 | Buquet | 73/861.04 |

Primary Examiner—Richard E. Chilcot, Jr.
Assistant Examiner—Jewel V. Artis
Attorney, Agent, or Firm—Oblon, Spivak, McClelland, Maier & Neustadt

[57] ABSTRACT

A powder flow rate is measured based on a simple construction so as to provide method and apparatus for measuring the powder flow rate for example of a powder coating material, requiring less maintenance cost and facilitating change of color of the coating material. In the method for measuring powder flow rate: a density $\rho 1$ of the powder within a tank is measured; the powder is drawn out from the tank into a conveying tube; a detecting fluid is blown at a flow rate $Qf$ into the conveying tube a density $\rho 2$ of the powder in the conveying tube is measured; and a powder flow rate $Fm$ is measured based on an equation of $Fm = Qf \cdot \rho 1 \cdot \rho 2/(\rho 1 - \rho 2)$. The density $\rho 1$ of the powder in the tank may be measured by providing a pair of pressure measuring devices at different heights within the tank. The density $\rho 2$ of the powder in the conveying tube may be measured through a measurement of electrostatic capacity, light transmittance or ultrasonic wave transmittance in the conveying tube.

24 Claims, 5 Drawing Sheets

METHOD AND APPARATUS FOR MEASURING POWDER FLOW RATE

BACKGROUND OF THE INVENTION

1. Field of the Invention

The present invention relates to a method and an apparatus for measuring a powder flow rate, which may be applied, for example, in supplying of a powder coating material.

2. Description of the Related Art

In automatic powder coating, it has been necessary to supply a coating material at a constant rate to achieve a uniform finish of paint coat and to efficiently use the coating material. In order to constantly supply the coating material, various methods for measuring its flow rate have been proposed for use in controlling the powder flow rate. For example, Japanese Patent Publication No.3-7045 and Japanese Patent Laid-Open No.62-64911 respectively disclose methods in which a detecting tube having a uniform diameter is provided in the conveying portion. A predetermined amount of a detecting fluid is blown into an inlet of the detecting tube, and pressures at the inlet and at an outlet thereof are detected to determine the powder flow rate based on difference between the two pressures.

In the method of measuring the powder flow rate by detecting such pressure difference, however, the powder tends to flow, backward into the pressure detecting part especially when, for example, the conveying of the powder is to be stopped. In order to prevent such backward flow of the powder to the pressure detecting part, flushing, for example, is necessary of a purge fluid or the like, requiring a large number of pipes, hoses, etc. Accordingly, the mechanism of the apparatus becomes complicated and the manufacturing cost of the apparatus is thereby increased. A much work time is also required for its installation and maintenance.

Further, while use of a screw feeder or the like is actually practiced to supply the powder coating material at a constant rate, the mechanism for such purpose intrinsically becomes of a large scale. The manufacturing cost of the apparatus is higher. In addition, the portion to be cleaned at the time of changing the color of coating material is complicated in structure, and this is very difficult to be coped with.

SUMMARY OF THE INVENTION

The present invention has been made to eliminate such problems, aiming at providing a method and an apparatus for measuring powder flow rate in which a powder flow rate is measured based on a simple construction, thereby reducing manufacturing cost and maintenance cost and facilitating change of color of the powder material.

To this end, a powder flow rate measuring method is provided in accordance with the present invention, in which: a density $\rho 1$ of the powder within a tank is measured; the powder is drawn out from the tank into a conveying tube; a detecting fluid is blown at a flow rate Qf into the conveying tube; a density $\rho 2$ of the powder within the conveying tube is measured; and a powder flow rate Fm is measured based on the following equation:

$$Fm = Qf \cdot \rho 1 \cdot \rho 2/(\rho 1 - \rho 2)$$

Further, an apparatus for measuring powder flow rate is provided in accordance with the present invention, comprising: a tank for containing a powder; a conveying tube connected to the tank; drawing out means for drawing out the powder from the tank into the conveying tube; first density measuring means for measuring the powder density within the tank; detecting fluid supplying means for blowing a detecting fluid into the conveying tube; flow rate adjusting means for adjusting flow rate of the detecting fluid to be blown into the conveying tube; second density measuring means for measuring the density of the powder which flows through the conveying tube together with the detecting fluid; and operation means for computing a flow rate of the powder based on the powder density in the tank measured by the first density measuring means, the powder density in the conveying tube measured by the second density measuring means and the flow rate of the detecting fluid adjusted at the fluid adjusting means.

DESCRIPTION OF THE PREFERRED EMBODIMENTS

Figure 1:
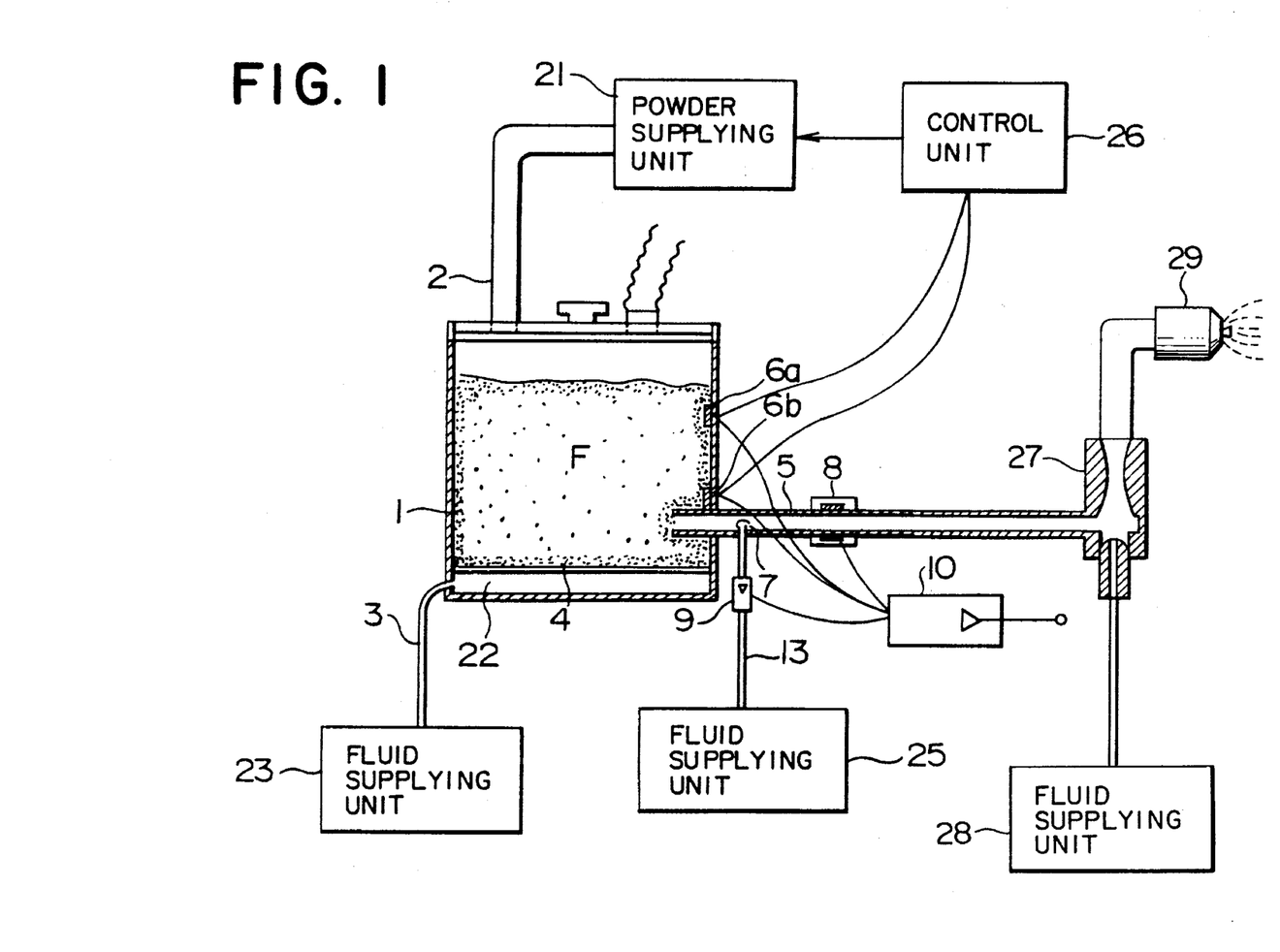
FIG. 1 is a block diagram showing a powder flow rate measuring apparatus according to an embodiment of the present invention.
Figure 2:
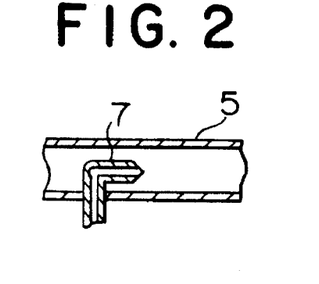
FIG. 2 is a cross sectional view showing the detecting fluid blow-in portion used in the embodiment of FIG. 1.

Some embodiments of the present invention will now be described with reference to the accompanying drawings. Referring to FIG. 1, a powder supplying unit 21 is connected via a powder supplying tube 2 to an upper portion of a tank 1 which is provided to contain a powder F. A space 22 partitioned by a porous plate 4 is formed at the bottom of the tank 1, and a first fluid supplying unit 23 is connected to the space 22 through a fluid supplying tube 3. A pair of pressure measuring devices 6a and 6b are provided in a manner vertically separated from each other on the internal wall of the tank 1. A conveying tube 5 for sending out the powder F is connected to the side of the tank 1. A nozzle 7 as shown in FIG. 2 is provided within the conveying tube 5 and a second fluid supplying unit 25 is connected to the nozzle 7 through a fluid supplying tube 13. Further, provided on the fluid supplying tube 13 is an adjusting device 9 for adjusting a flow rate Qf of the fluid supplied to the nozzle 7 from the second fluid supplying unit 25.

The first fluid supplying unit 23 is provided to supply a fluid such a compressed air for fluidizing the powder F in the tank 1. The fluid is introduced into the tank 1 from the space 22 through a large number of holes formed on the porous plate 4. Thereby, the powder F is fluidized in the tank 1. On the other hand, the second fluid supplying unit 25 supplies a detecting fluid such as a compressed air into the conveying tube 5 through the nozzle 7.

Figure 3A:
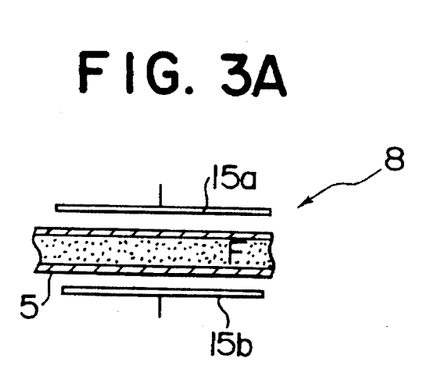
FIG. 3A is a sectional view showing a second density measuring means.

Provided along the conveying tube 5 on the downstream side of the nozzle 7 is an electrostatic capacity measuring device 8 for measuring the electrostatic capacity of the powder F within the conveying tube 5. As shown in FIG. 3A, the electrostatic capacity measuring device 8 includes a pair of electrode plates 15a and 15b sandwiching the conveying tube 5 from both sides thereof, a power supply (not shown) being connected to the electrode plates 15a and 15b. An operation unit 10 is electrically connected to the pressure measuring devices 6a and 6b, the electrostatic capacity measuring device 8 and the adjusting device 9. The operation unit 10 calculates density $\rho 1$ of the powder F within the tank 1 from the pressures measured at the pressure measuring devices 6a and 6b and calculates density $\rho 2$ of the powder F within the conveying tube 5 from the electrostatic capacity measured at the electrostatic capacity measuring device 8. It furthermore computes a powder flow rate Fm based on the densities $\rho 1$ and $\rho 2$ and a flow rate Qf of the detecting fluid. It should be noted that a shield for covering the electrostatic capacity measuring device 8 is preferably provided in order to avoid a disturbance.

Furthermore, a control unit 26 is connected to the pressure measuring devices 6a, 6b and the powder supplying unit 21. The control unit 26 calculates the density $\rho 1$ of the powder F within the tank 1 from the pressures measured at the pressure measuring devices 6a and 6b and controls the supplying of the powder F into the tank 1 from the powder supplying unit 21 such that the calculated density $\rho 1$ of the powder F within the tank 1 is maintained at a constant level. In other words, the supplying rate of the powder F to be supplied into the tank 1 through the powder supplying tube 2 is increased when the measured value of the density $\rho 1$ is less than a predetermined value, while the supplying rate of the powder F is decreased when the measured value of the density $\rho 1$ exceeds the predetermined value.

A spray gun 29 is connected to the conveying tube 5 via an injector 27 to which a third fluid supplying unit 28 is connected. The third fluid supplying unit 28 supplies a drawing fluid such as a compressed air into the injector 27 for drawing out the powder F from the tank 1 through the conveying tube 5 by utilizing the negative pressure. The flow rate of the drawing fluid is adjusted by the third fluid supplying unit 28 to control the powder flow rate from the tank 1.

It is also possible that, instead of providing the first to third fluid supplying units 23, 25 and 28 separately from each other, the fluid supplying units 23, 25 and 28 may be constructed from a common supplying device.

Figure 4:
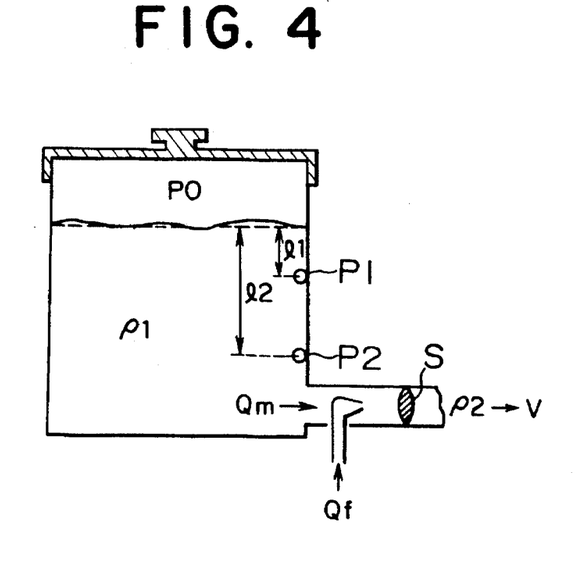
FIG. 4 is a view for explaining the measuring method of a density of powder within a tank.

The principle for measuring the powder flow Fm which is the discharge from the tank 1 will now be described with reference to FIG. 4. In FIG. 4, assuming the powder density in the tank 1 as $\rho 1$ (g/cm³), the powder density in the conveying tube 5 as $\rho 2$ (g/cm³), the cross sectional area of the conveying tube 5 as S (cm²) (constant), the flow rate of the mixed fluid drawn out from the tank 1 as Qm (cm³/min), and the flow rate of the detecting fluid as Qf (cm³/min) (constant)—powder flow rate Fm (g/min) may be expressed by:

$$Fm = \rho 2 \cdot S \cdot v \qquad (A)$$

and the flow speed v (cm/s) within the tube 5 is expressed by:

$$v = (Qm+Qf)/S = (Fm/\rho 1 + Qf)/S \qquad (B)$$

By substituting equation B into equation A:

$$Fm = \rho 2(Fm/\rho 1 + Qf) = Fm \cdot \rho 2/\rho 1 + Qf \cdot \rho 2$$

and Fm may be obtained as:

$$\begin{aligned} Fm &= Qf \cdot \rho 2/(1 - \rho 2/\rho 1) \\ &= Qf \cdot \rho 2/(\rho 1 - \rho 2)/\rho 1 \\ &= Qf \cdot \rho 1 \cdot \rho 2/(\rho 1 - \rho 2) \end{aligned} \qquad (C)$$

It is seen that the powder flow rate Fm may be computed from the flow rate Qf of the detecting fluid and the densities $\rho 1$ and $\rho 2$ of the powder F.

It should be noted that, when the flow rate Qf of the detecting fluid is increased to such an extent that the flow rate Qm of the mixed fluid drawn out of the tank 1 may be ignored, the density $\rho 2$ of the powder F within the conveying tube 5 becomes extremely small comparing to the density $\rho 1$ within the tank 1 and may be ignored. Therefore, the above equation C may be approximated as:

$$Fm = Qf \cdot \rho 2$$

Further, in FIG. 4, it is supposed that P0 (g/cm²) is the pressure of the air within the tank 1 while P1 (g/cm²) and P2 (g/cm²) are the pressures measured, respectively, by the pressure measuring devices 6a and 6b at depths of l1 (cm) and l2 (cm) from the upper surface of the fluidized powder F. From the relation of the pressures in the tank, the following equations are obtained:

$$P1 = P0 + l1 \cdot \rho 1$$

$$P2 = P0 + l2 \cdot \rho 1$$

In other words, $$\Delta P = P2 - P1 = \rho 1(l2 - l1)$$

is obtained, and the density $\rho 1$ of the powder F which is fluidized within the tank 1 may be represented by:

$$\rho 1 = \Delta P/(l2 - l1) \qquad (D)$$

Here, since not the pressures on a conveying route but the pressures within the tank 1 are measured, there is no risk of backward flowing of the powder F into pressure measuring portions, that is, the pressure measuring devices 6a and 6b. Accordingly, by continuously keeping a constant amount of the powder F within the tank 1 using the control unit 26 and the powder supplying unit 21, the density $\rho 1$ of the powder F may be readily measured based on the pressure difference $\Delta P$ which is measured by the pair of pressure measuring devices 6a and 6b.

Figure 3B:
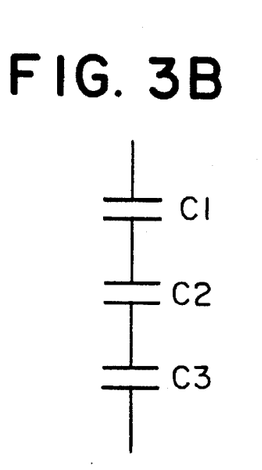
FIG. 3B is a diagram showing an equivalent circuit of the second density measuring means.

On the other hand, it is supposed in FIG. 3A that C1 is the electrostatic capacity of the air between the electrodes 15a and 15b, C2 is the electrostatic capacity of the conveying tube 5 itself and C3 is the electrostatic capacity of the powder F within the tube 5. Since the electrostatic capacity C between the electrodes 15a and 15b may be computed by serially connecting C1, C2 and C3 as shown in FIG. 3B, the following equation is obtained.

$$1/C = 1/C1 + 1/C2 + 1/C3 \qquad (E)$$

Here, C1 and C2 are constant and C3 is varied according to the density $\rho 2$ of the powder F.

Supposing the powder F within the conveying tube 5 as a parallel-plates capacitor, this may be expressed as:

$$C3 = \epsilon s \cdot \epsilon_0 \cdot H/d$$

Here, $\epsilon s$ is the dielectric constant of the mixed fluid (powder F and air) within the conveying tube 5, $\epsilon_0$ is dielectric constant of vacuum, and H and d are respectively the area and electrode separation of the electrodes of the capacitor. Since, of these, $\epsilon_0$, H and d are fixed, the following equation is obtained by using a constant k:

$$C3 = k \cdot \epsilon s$$

Figure 5:
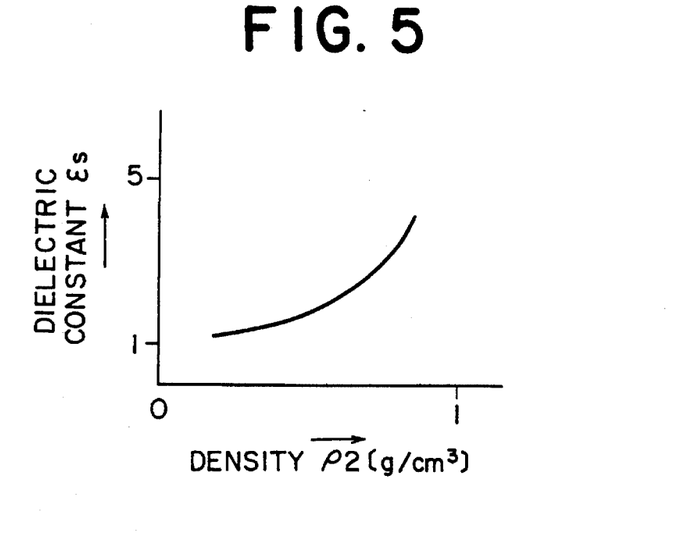
FIG. 5 is a graph showing the relation between powder density and dielectric constant.

Furthermore, since the dielectric constant of the powder F which is a solid is 3~5 and the dielectric constant of air is about 1, the dielectric constant $\epsilon s$ of the mixed fluid takes values between 1 and 5, being, in fact, a function of the density $\rho 2$ of the powder F as shown in FIG. 5. Accordingly, C3 may also be represented as a function of the density $\rho 2$ as follows:

$$C3 = f(\rho 2) \qquad (F)$$

Thus, a voltage E from a power supply (not shown) is applied across the electrode plates 15a and 15b of the electrostatic capacity measuring device 8. An electric current I flowing at that time is measured, where:

$$I = E \cdot j\omega C \qquad (G)$$

Based on the above equations E, F and G, the current I may be represented as a function of the density $\rho 2$ of the powder F as follows:

$$I = g(\rho 2)$$

Accordingly, it is possible to obtain the density $\rho 2$ of the powder F in the conveying tube 5 by measuring the current I.

Operation of this embodiment will now be described. First, a compressed air is supplied from the first fluid supplying unit 23 into the space 22 at the bottom of the tank 1 so that the compressed air enters the tank 1 through a large number of holes formed in the porous plate 4. The powder F is thereby fluidized. Next, pressures P1 and P2 measured respectively at the pressure measuring devices 6a and 6b in the tank 1 are delivered to the control unit 26, where the density $\rho 1$ of the powder F is computed based on the above equation D. The control unit 26 controls the powder supplying unit 21 such that the value of the density $\rho 1$ is kept at a constant level.

In this state, a compressed air serving as the drawing fluid is blown into the spray gun 29 through the injector 27 from the third fluid supplying unit 28, so that the negative pressure is generated in the end of the conveying tube 5 which is connected to the injector 27. The powder F is thereby drawn out from the tank 1 to the injector 27 through the conveying tube 5 and then sprayed out from the spray gun 29. On the other hand, a compressed air serving as the detecting fluid is blown into the conveying tube 5 through the nozzle 7 from the second fluid supplying unit 25 to accelerate the powder F in the conveying tube 5. The flow rate Qf of the detecting fluid is maintained at a constant level by the adjusting device 9 and the flow rate Qf is delivered from the adjusting device 9 to the operation unit 10. Further, the current I at the time of applying a predetermined voltage E across the electrode plates 15a and 15b is measured at the electrostatic capacity measuring device 8 and the result is sent to the operation unit 10.

The operation unit 10 calculates the density $\rho 1$ of the powder F within the tank 1 from the pressures measured at the pressure measuring devices 6a and 6b and calculates the density $\rho 2$ of the powder F within the conveying tube 5 from the value of the current I, and furthermore the powder flow rate Fm is calculated from the densities $\rho 1$ and $\rho 2$ and the flow rate Qf of the detecting fluid based on the above equation C.

Figure 6A:
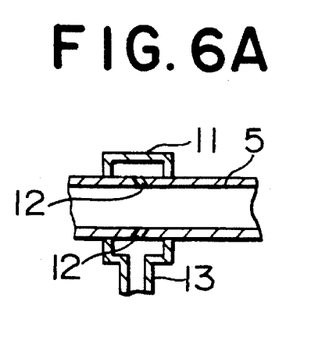
FIG. 6A is a cross sectional view showing a modification of the detecting fluid blow-in portion.
Figure 6B:
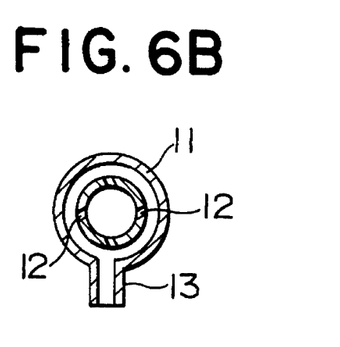
FIG. 6B is a longitudinal sectional view of the blow-in portion of FIG. 6A.

It should be noted that, instead of the nozzle 7, a detecting fluid blow device as shown in FIGS. 6A and 6B may be used. This blow device includes: an annular pressure chamber 11 formed in a manner surrounding the outer periphery of the conveying tube 5 and connected to the fluid supplying tube 13; and a plurality of blow-in holes 12 formed within the annular pressure chamber 11, extended from the periphery of the conveying tube 5 in a manner inclined toward the tangent line and toward the downstream side thereof. The detecting fluid is supplied into the conveying tube 5 as a convoluted flow toward the downstream side. For this reason, unevenness and deposition of the powder F within the conveying tube 5 may be prevented.

Figure 7:
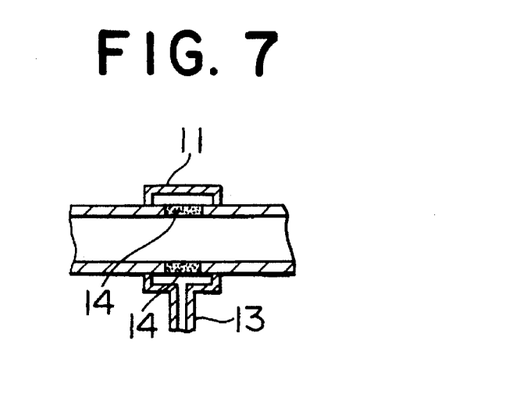
FIG. 7 is a cross sectional view showing another modification of the detecting fluid blow-in portion.

Further, as shown in FIG. 7, instead of forming a plurality of blow-in holes 12 within the annular pressure chamber 11, the tubular wall of the conveying tube 5 within the annular pressure chamber 11 may be constructed from a porous plate 14. Plastics or sintered ceramics may be used as the material for the porous plate 14. In this manner, the density $\rho 2$ of the powder F within the conveying tube 5 tends to be uniformed.

Figure 8:
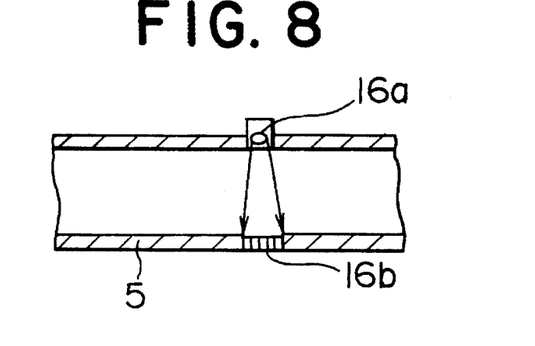
FIG. 8 is a sectional view showing a modification of the second density measuring means.
Figure 9:
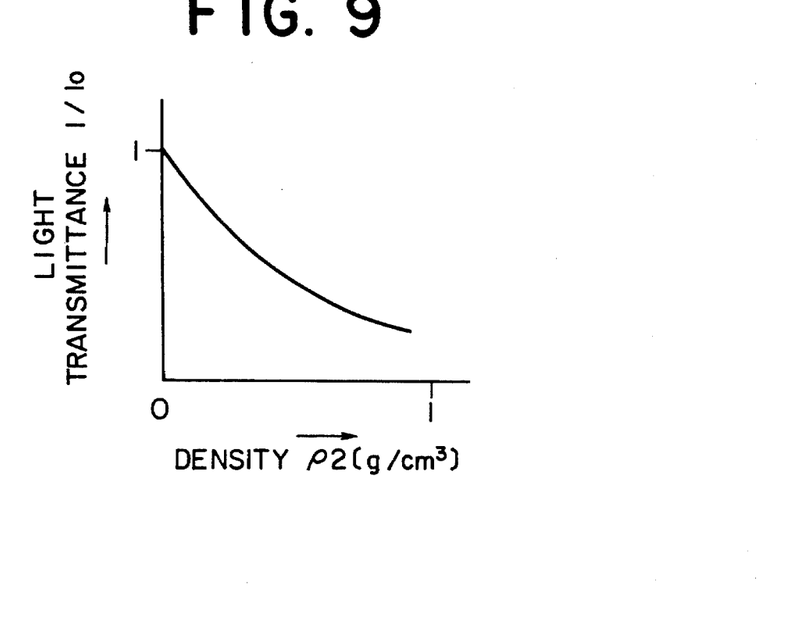
FIG. 9 is a graph showing the relation between powder density and light transmittance.

As a method for computing the density $\rho 2$ of the powder F in the conveying tube 5, it is also possible as shown in FIG. 8 to provide a light emitting device 16a and a light receiving device 16b such that they face each other in the conveying tube 5, so as to measure transmittance of the light reaching the light receiving device 16b from the light emitting device 16a. The transmittance may be represented as ratio $I/I_0$ of the output $I_0$ of the light receiving device 16b without the powder F and the output I of the light receiving device 16b at the time when the powder F is caused to flow, it being related to the density $\rho 2$ of the powder F as shown in FIG. 9. Thus, by measuring the transmittance $I/I_0$, the density $\rho 2$ may be computed. It should be noted that not only the transmitted light but also a scattered light may be taken at the same time. To reduce the effect of a disturbance, light modulation or use of a single-wavelength light source is effective.

Figure 10:
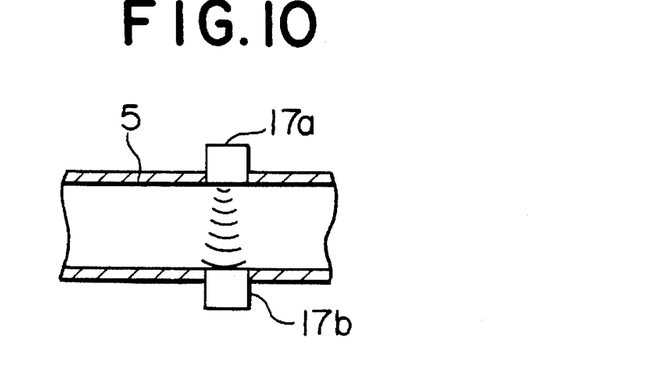
FIG. 10 is a sectional view showing another modification of the second density measuring means.
Figure 11:
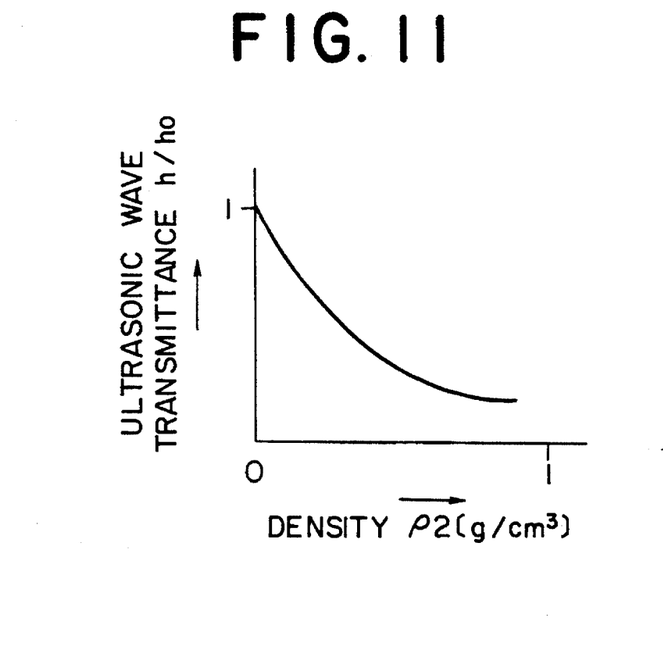
FIG. 11 is a graph showing the relation between powder density and ultrasonic wave transmittance.

Further, it is also possible as shown in FIG. 10 to provide an ultrasonic transmitter 17a and an ultrasonic receiver 17b such that they face each other in the conveying tube 5. The transmittance of the ultrasonic wave is represented by ratio $h/h_0$ of the output $h_0$ of the receiver 17b without the powder F and the output h of the receiver 17b when the powder F is caused to flow, it being related to the density $\rho 2$ of the powder F as shown in FIG. 11. Thus the density ρ2 may be computed by measuring the transmittance $h/h_0$.

Figure 12:
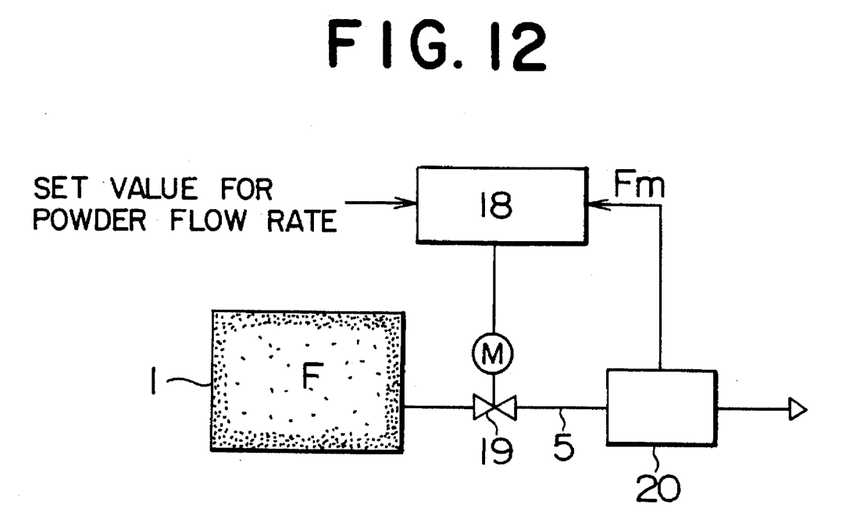
FIG. 12 is a block diagram for schematically showing a powder flow rate control apparatus using the powder flow rate measuring apparatus of the present invention.

FIG. 12 shows a powder flow rate controlling apparatus using the powder flow rate measuring apparatus according to the present invention. While the powder F drawn out from the tank 1 is supplied through the conveying tube 5 to a site where it is to be applied, the powder flow rate Fm is measured by the powder flow rate measuring apparatus 20 as described above and the measured value is delivered to the flow rate control apparatus 18. A predetermined value of powder flow rate is set at the flow rate control apparatus 18. The flow rate control apparatus 18 compares the measured value with the set value, and drives a motor M to control opening/closing of a control valve 19 provided in the conveying tube 5 such that the two values coincide with each other. Thereby, the flow rate of the powder F discharged from the tank 1 is controlled to a constant level. It should be noted that it is also possible to dispose the control valve 19 at the downstream side of the powder flow rate measuring apparatus 20.

Inactive gases may be substituted for the compressed air supplied from the first to third fluid supplying units 23, 25 and 28.

The powder flow rate measuring apparatus according to the present invention may readily be applied to a conventional powder conveying apparatus. Further, it requires less piping. Its manufacturing cost is lower because its structure is simple. Since none of its portions contacts the powder, its maintenance and handling such as in changing of color is also easier.

What is claimed is:

1. A method for measuring powder flow rate, comprising the steps of:

measuring a density ρ1 of a powder within a tank;

drawing out the powder from the tank into a conveying tube;

blowing a detecting fluid at a flow rate Qf into the conveying tube;

measuring a density ρ2 of the powder in the conveying tube; and measuring powder flow rate Fm within the conveying tube based on the following equation:

$$Fm = Qf \cdot \rho1 \cdot \rho2/(\rho1 - \rho2).$$

2. The method according to claim 1, wherein when the flow rate Qf of the detecting fluid is increased to such an extent that the density ρ2 within the conveying tube becomes extremely small compared to the density ρ1 within the tank and may be ignored, the powder flow rate Fm within the conveying tube is computed based on the following approximate equation:

$$Fm = Qf \cdot \rho2.$$

3. The method according to claim 1, wherein the measurement of the density ρ1 of the powder in the tank is performed through a measurement of pressure difference between two positions different in their height within the tank.

4. The method according to claim 1, wherein the measurement of the density ρ2 of the powder in the conveying tube is performed through a measurement of electrostatic capacity of the powder within the conveying tube.

5. The method according to claim 1, wherein the measurement of the density ρ2 of the powder in the conveying tube is performed through a measurement of light transmittance within the conveying tube.

6. The method according to claim 1, wherein the measurement of the density ρ2 of the powder in the conveying tube is performed through a measurement of transmittance of an ultrasonic wave within the conveying tube.

7. An apparatus for measuring powder flow rate, comprising:

a tank containing a powder;

a conveying tube connected to said tank;

drawing out means for drawing out the powder from said tank into said conveying tube;

first density measuring means for measuring density of the powder within said tank;

detecting fluid supplying means for blowing a detecting fluid into said conveying tube;

flow rate adjusting means for adjusting the flow rate of the detecting fluid blown into said conveying tube;

second density measuring means for measuring density of the powder flowing within said conveying tube together with the detecting fluid; and operation means for computing a flow rate of the powder based on the powder density in said tank measured at said first density measuring means, the powder density in said conveying tube measured at said second density measuring means and the flow rate of the detecting fluid adjusted at said flow rate adjusting means.

8. The apparatus according to claim 7, said first density measuring means includes a pair of pressure measuring devices respectively disposed at different heights from each other within said tank.

9. The apparatus according to claim 7, wherein said second density measuring means includes an electrostatic capacity measuring device for measuring electrostatic capacity of the powder within said conveying tube.

10. The apparatus according to claim 9, wherein said electrostatic capacity measuring device includes a pair of electrodes disposed in a manner sandwiching said conveying tube.

11. The apparatus according to claim 7, wherein said second density measuring means includes a light emitting device and a light receiving device disposed within said conveying tube.

12. The apparatus according to claim 7, wherein said second density measuring means includes an ultrasonic transmitter and an ultrasonic receiver disposed within said conveying tube.

13. The apparatus according to claim 7, wherein said detecting fluid supplying means includes a first supplying device for supplying the detecting fluid, and introduction means for introducing the detecting fluid supplied from the first supplying device into said conveying tube.

14. The apparatus according to claim 13, wherein said introduction means includes a nozzle.

15. The apparatus according to claim 13, wherein said introduction means includes: an annular pressure chamber surrounding an outer periphery portion of said conveying tube and connected to said first supplying device; and a plurality of blow-in holes formed on said conveying tube within the annular pressure chamber.

16. The apparatus according to claim 13, wherein said introduction means includes: an annular pressure chamber surrounding an outer periphery portion of said conveying tube and connected to said first supplying device; and a porous plate formed as tubular wall of said conveying tube within the annular pressure chamber.

17. The apparatus according to claim 7, further comprising: a powder supplying unit for supplying a powder into said tank; and a control unit for controlling said powder supplying unit such that the density measured at said first density measuring means is kept at a constant level.

18. The apparatus according to claim 7, further comprising a second supplying device by which a fluid for drawing the powder is supplied into said tank from the bottom of said tank.

19. The apparatus according to claim 18, wherein said tank has a floor comprising a porous plate at the bottom thereof, said second supplying device supplying the fluid for drawing the powder into said tank through said floor.

20. The method of claim 1, further including supplying the powder to said tank to maintain $\rho 1$ constant.

21. The method of claim 1, further including providing a nozzle downstream of said conveying tube.

22. The method of claim 1, further including controlling the powder flow rate to maintain a measured powder flow rate at a predetermined value.

23. The method of claim 22, wherein the step of controlling the powder flow rate includes providing a valve, and controlling opening and closing movements of said valve based upon the measured powder flow rate such that said valve is moved in an opening direction when said measured powder flow rate is below said predetermined value and said valve is moved in a closing direction when said measured powder flow rate is greater than said predetermined value.

24. The method of claim 1, further including providing a nozzle downstream of said conveying tube, and providing a valve for controlling a powder flow rate through said nozzle, the method further including controlling said valve in response to a measured powder flow rate.

* * * * *